US007020723B2

(12) United States Patent
Beaudoin et al.

(10) Patent No.: US 7,020,723 B2
(45) Date of Patent: Mar. 28, 2006

(54) METHOD OF ALLOWING MULTIPLE, HARDWARE EMBEDDED CONFIGURATIONS TO BE RECOGNIZED BY AN OPERATING SYSTEM

(75) Inventors: Denis R. Beaudoin, Rowlett, TX (US); Gregory Guyotte, Dallas, TX (US); Michael J. Hanrahan, Rockwall, TX (US); William S. Egr, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 128 days.

(21) Appl. No.: 10/421,566

(22) Filed: Apr. 23, 2003

(65) Prior Publication Data

US 2004/0215861 A1 Oct. 28, 2004

(51) Int. Cl.
*G06F 13/10* (2006.01)
*G06F 13/38* (2006.01)

(52) U.S. Cl. .............................. 710/8; 710/62; 710/71; 710/300; 710/305

(58) Field of Classification Search ............. 710/8–10, 710/62, 71, 300–305, 313; 713/1, 2, 100
See application file for complete search history.

(56) References Cited

U.S. PATENT DOCUMENTS 6,003,097 A * 12/1999 Richman et al. ............... 710/8
6,425,033 B1 * 7/2002 Conway et al. ............. 710/305
6,446,142 B1 * 9/2002 Shima et al. ................. 710/16
6,496,893 B1 * 12/2002 Arai ........................... 710/302
6,523,081 B1 * 2/2003 Karlsson et al. ............ 710/305
6,567,876 B1 * 5/2003 Stufflebeam ................ 710/303
6,671,748 B1 * 12/2003 Cole et al. ..................... 710/8

* cited by examiner

*Primary Examiner*—Ilwoo Park
(74) *Attorney, Agent, or Firm*—W. James Brady, III; Frederick J. Telecky, Jr.

(57) ABSTRACT

A communications system for enabling extension of an internal common bus architecture (CBA) segment of a first root physical device to an internal CBA bus segment of one or more remote external physical device includes the first root physical device having a first serial communications interface module in the root device coupled between said internal CBA bus segment and an input and output port of the root device for serializing bus transactions from the first device to the output port of the root device and deserializing data received from at the input port to the internal CBA bus segment of the first device. The remote external physical device includes a second serial communications interface module coupled between the internal CBA bus segment and an input and output port of the remote device for serializing bus transactions from the remote device to the output port of the remote device and deserializing data received at the input port to the internal CBA bus segment of said remote device. The modules are coupled to each other by an external cabling. An enumerator in the root device obtains knowledge of the remote hardware module and accompanying register set by abstracting these details and automatically configuring the remote module in the system.

8 Claims, 2 Drawing Sheets

METHOD OF ALLOWING MULTIPLE, HARDWARE EMBEDDED CONFIGURATIONS TO BE RECOGNIZED BY AN OPERATING SYSTEM

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF INVENTION

This invention relates to a serial, low pin count communications interface that enables the extension of an internal Common Bus Architecture (CBA) bus segment to one or more external physical devices and more particularly to a method of allowing multiple, hardware embedded configurations to be recognized by an Operating System in an independent manner.

BACKGROUND OF INVENTION

The communication to and from both home and office is undergoing a change to provide both cable and DSL broadband access. It is highly desirable to provide a common computer/software/peripheral platform architecture across cable, DSL, IEEE 802.11, IP phone and voice gateways. A communications processor architecture includes a 32-bit MIPS processor, a switched bus architecture, a distributed DMA architecture, optimized memory interface, programmable memory management and write back or write through cache write policy. The software platform for the services includes device drivers (USB, PCI, Ethernet, HDLC, Timers, 802.11 etc.), RTOS support (VxWorks, Linux, Nucleus etc.), networking software (ATM, TCP/IP, bridging, routing, filtering etc.), network management (SNMP, web servers/stacks), PC drivers, and robust APIs with clearly defined software layers for customers to add value. A communications chip for all of these markets becomes costly. Texas Instruments Inc. built a product that has two DSPs for voice, many interfaces, a mixed signal processor, RAM, a MAC, a complete segmentation re-assembly (SAR) engine for ATM, HM interface, a broadband interface, memory interface and a VGA. The result is a product that has 256 pins and the chip becomes costly. This is also not very expandable because any expansion peripherals must be placed on the memory bus, which consumes memory bandwidth that is critical to the operation speed of the CPU. This also means that access to the peripheral is in the asynchronous cycle, which is slow as compared to DRAM. A 16-bit bus could be added with 32 pins but that is costly and would have a limited memory range. Many developers for products in these areas do not want to pay for such a costly chip with excess functionality. We have had to disable features on the chip but the customer still has to pay for features not used.

It is highly desirable to provide platforms for market segments wherein the main function is functionally integrated and an expansion capability is provided via a low cost, software compatible communications link.

Texas Instruments Incorporated provides for this by providing a serial, low pin count communications interface that enables the extension of an internal Common Bus Architecture (CBA) bus segment to one or more external physical devices. This is known as VLYNQ and it accomplishes this function by serializing bus transactions in one device, transferring the serialized transaction between devices via a VLYNQ port, and de-serializing the transaction in the external device. Multiple VLYNQ modules may be included on a single device such that VLYNQ devices are effectively daisy chained.

Referring to FIG. 1 there is illustrated a serial (i.e. low pin count) communications interface (VLYNQ) that enables the extension of an internal CBA (labeled VBUSP) bus segment to one or more external physical devices. VLYNQ accomplishes this function by serializing bus transactions in one device, transferring the serialized transaction between devices via a VLYNQ port, and de-serializing the transaction in the external devices. VLYNQ is a 3,5,7 or 9-pin serial interface for 1,2,3 or 4 bit parallel (serial but four bit wide) interface that allows one to connect peripherals that previously could not be directly connected to a communications processor. The devices have an internal bus (VBUS). VLYNQ is a serial interface that connects the internal bus of one device to an internal VBUS of another device. The internal VLYNQ accomplishes this function by serializing bus transactions in one device, transferring the serialized transaction between devices via a VLYNQ port, and de-serializing the transaction in the external device.

As illustrated in FIG. 1 the host communication processor 11 includes an internal VBUS (a virtual bus) 11*a* and a VLYNQ interface module 13 connected by a serial cable 12 to a peripheral such as a Texas Instruments Inc. C55x Voice DSP 15 that also contains a VLYNQ interface module 17 connected to VBUS 15*a* of DSP 15. The VBUS or virtual bus is internal to a semiconductor chip or device and provides the communications between modules on the chip or device using the chip or device standard protocols. The transmit pins on the first device 13 connect to the receive pins on the second device 17. Request packets, response packets, and flow information are all multiplexed and sent across the same physical pins. The above described connection between processor 11 and DSP 15 is a VLYNQ host-to-peripheral connection. A peer-to-peer connection is also provided. This enables the extension of an internal common bus architecture bus segment to one or more external physical devices. In FIG. 1 the first peripheral device (C55x Voice DSP) 15 includes a second VLYNQ interface module 19 connected to the internal VBUS 15*a* that is coupled by serial cable 14 to VLYNQ interface 20 at a second voice DSP 21 for a peer-to-peer connection. The second voice DSP 21 can be daisy chained to other DSPs or other peripherals via VLYNQ interface 23 and another cable.

An example of an application enabled by VLYNQ is a low cost derived voice application, allowing one or more C55x DSP devices to connect to an a Texas Instruments Inc. Avalanche Broadband Controller over 3-pin serial interfaces. For more information of VLYNQ, refer to application Ser. No. 10/382,679 filed Mar. 6, 2003 entitled "Communications Interface". This application is incorporated herein by reference.

Successfully connecting VLYNQ devices requires an in-depth knowledge of the hardware module and accompanying register set. It is therefore highly desirable to provide a method to aid in connecting the devices.

SUMMARY OF THE INVENTION

In accordance with one embodiment of the present invention, an in-depth knowledge of the hardware module and accompanying register set is provided by abstracting these details and automatically configuring the module in the system.

In accordance with an embodiment of the present invention a method of allowing multiple, hardware embedded configurations to be recognized by an operating system in a root device comprises the steps of recognizing and utilizing multiple embedded hardware configurations in remote devices and making the configurations recognizable by an operating system in an independent manner.

In accordance with an embodiment of the present invention an enumerator discovers all remote devices and creates address and interrupt maps between remote devices and a root device.

In accordance with an embodiment of the present invention an enumerator reads a remote device identification register and locates associated device configuration file and then determines if the remote device has more than one interface module and if there is more than one interface module, recursively performing the previous steps until the end of the interface chain is reached.

In accordance with an embodiment of the present invention, a communication system for enabling extension of an internal common bus architecture (CBA) bus segment of a first root device to an internal CBA bus segment of a second device includes a module in the first device and a module in the second device and an external cable between these modules. The first root device includes an enumerator for automatically configuring for said second device module or more modules and/or external devices to be added to the system by a recursive discovery and configuration algorithm.

DESCRIPTION OF PREFERRED EMBODIMENTS

VLYNQ is a serial, low pin count communication interface that enables the extension of an internal Common Bus Architecture (CBA) bus segment to one or more external physical devices. VLYNQ accomplishes this function by serializing bus transactions in one device, transferring the serialized transaction between devices via a VLYNQ port, and de-serializing the transaction in the external device.

Figure 1:
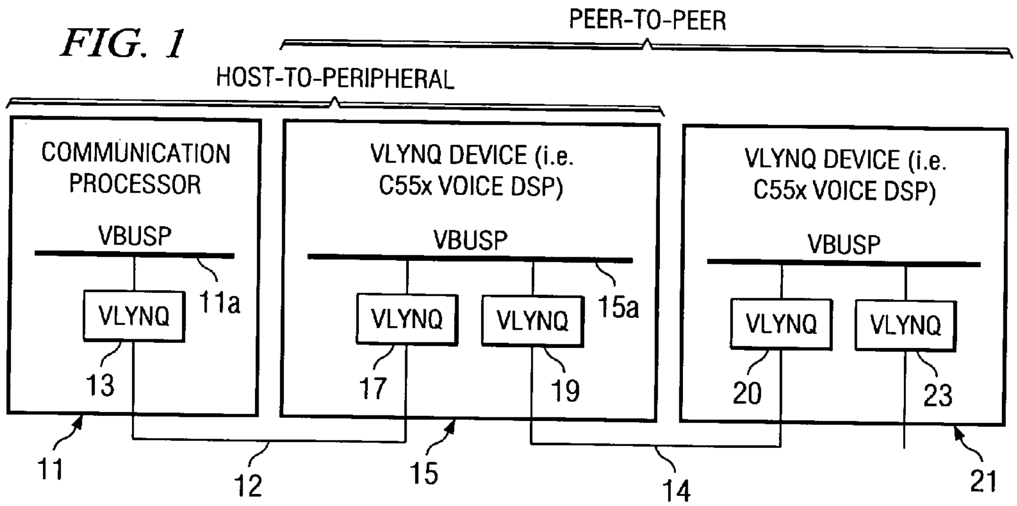
FIG. 1 is a block diagram of a host to peer and peer-to-peer serial interface connection according to one embodiment of the present invention.
Figure 2:
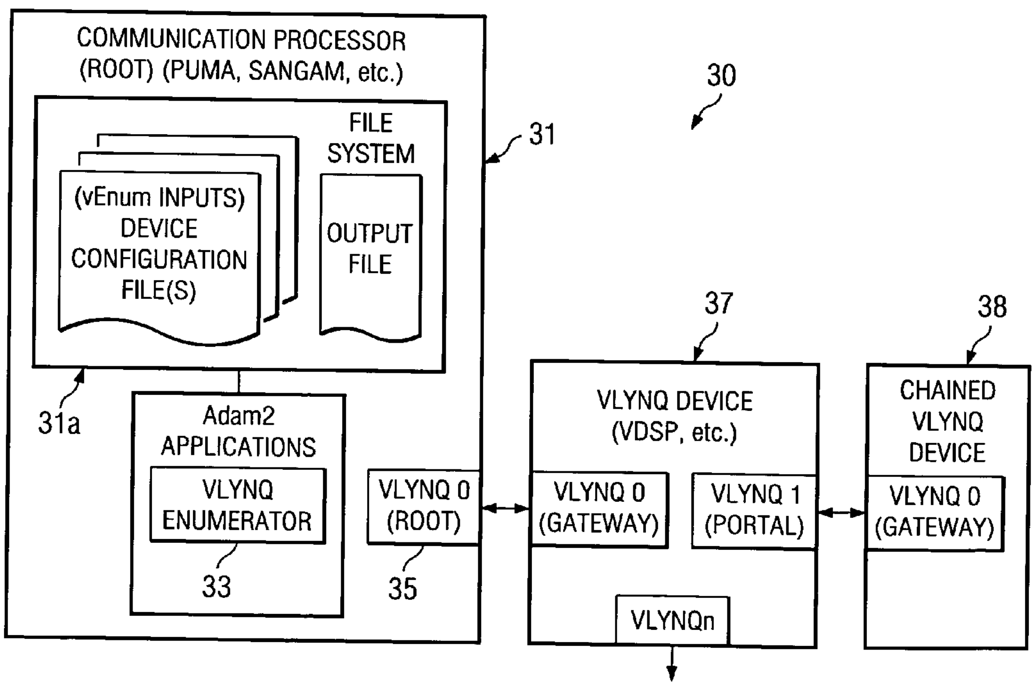
FIG. 2 illustrates a method of allowing multiple, hardware embedded configurations to be recognized by an Operating System in an independent manner.

Referring to FIG. 2 there is shown the placement of a VLYNQ enumerator 33 in the system 30. The "root" device (typically the communication processor) 31 is the single device that executes the VLYNQ enumerator software. The examples of Puma or Sangam are given. It must contain at least one VLYNQ module (VLYNQ 0 (root)) 35.

Throughout this document, references are made to VLYNQ "gateways" and "portals". The definition of a VLYNQ gateway is a VLYNQ module on a remote device that is the first one encountered when traversing out from the root device. Each device, therefore, has a single VLYNQ gateway module. All other VLYNQ modules on each remote device are termed "portals".

Several references are made to VLYNQ "branches". A branch is defined as all of the remote VLYNQ devices connected to a single root VLYNQ module. This includes the directly connected device and any daisy-chained devices connected from that point.

Successfully utilizing VLYNQ would normally require an in-depth knowledge of the hardware module and accompanying register set. The purpose of the VLYNQ enumerator is to abstract these details from the higher-level software developers, freeing them to focus on applications.

The VLYNQ enumerator software 33 automatically configures each VLYNQ in the system 30, creating a unified view of the system from the software perspective. Developers need little or no knowledge about VLYNQ hardware. The enumerator 33 operation is designed to be executed during system boot, and requires no intervention on the part of the user. The only required inputs are properly formatted device configuration files for each VLYNQ device in the system. The format of these files is specified in later in the specification under Device Information Files. The output of the enumerator 33 is an output file that contains address maps and interrupt information for each device (37 and 38) and VLYNQ module discovered in the system 30. This file is discussed in more detail later in The Output File.

The heart of the VLYNQ enumerator 33 is a recursive discovery and configuration algorithm. It discovers all remote VLYNQ devices like 37 and 38 and creates address and interrupt maps from remote devices back to the root device. The VLYNQ module has flexible, built-in facilities for address translation and interrupt forwarding. Based on the identities of the discovered VLYNQ devices (and their associated device information files), the enumerator 33 configures each VLYNQ and puts the results in an output file of the file system. For the example of FIG. 2 it is the file system 31*a* of the communications processor (root).

Remote devices are identified using VLYNQ's chip version register. The enumerator 33 is able to read the remote chip version register to identify remote devices and determine which device information file should be accessed. The table that follows lists the device ID's that have currently been assigned:

List of Device ID's

| Device | ID |
|---|---|
| Avalanche 1 | 0x0001 |
| Avalanche-D | 0x0002 |
| Avalanche "Taos" | 0x0003 |
| Avalanche "Puma" | 0x0004 |
| Avalanche "Sangam" | 0x0005 |
| Voice DSP "VDSP" | 0x0006 |
| Avalanche "Titan" | 0x0007 |

Each "pass" of the VLYNQ enumerator 33 configures a single branch of the system. A branch in this case is defined as all VLYNQ devices connected to a single VLYNQ module on the root device. The software reads the root device configuration file to determine how many VLYNQ modules are on the root device. For each root module, the recursive algorithm is executed (this is one "pass" of the enumerator).

Figure 3:
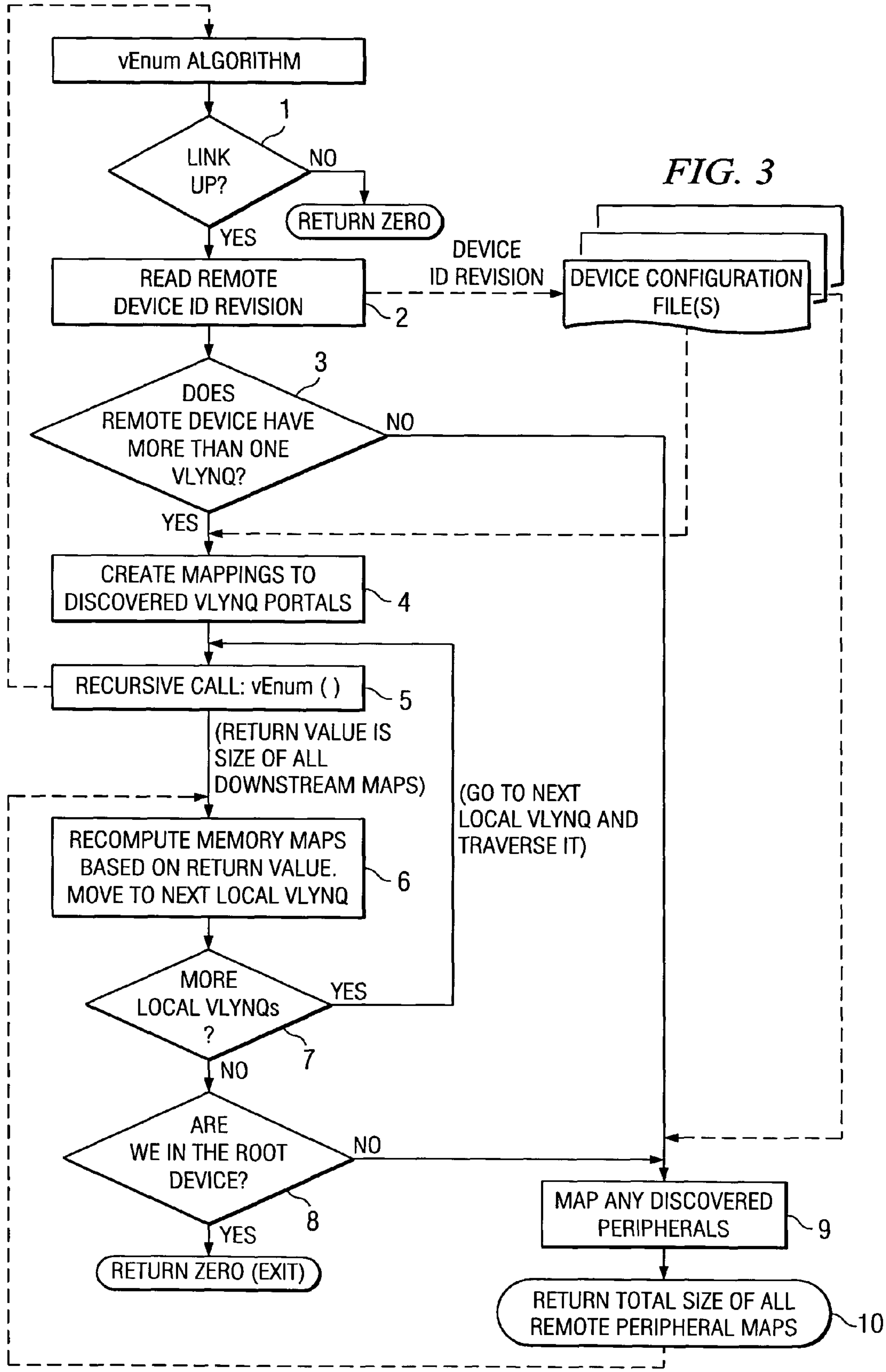
FIG. 3 illustrates the recursive algorithm used to configure VLYNQ systems.

FIG. 3 depicts the operation of the recursive algorithm. In short, the algorithm traverses the VLYNQ chain until it reaches the end device, which has no more VLYNQ modules or connections. Peripherals and interrupts on the end device are then mapped, and the algorithm returns the sum of all the address space that was mapped. This return value is necessary to properly configure the size of the VLYNQ portal.

In the enumerator algorithm, starting with a VLYNQ module on the root device, it determines if there is a link (Step 1). If there is a link, the enumerator 33 reads the remote device identification register and locates the associated device configuration file (Step 2). It then determines if the remote device has more than one VLYNQ. If there is more than one VLYNQ, the enumerator 33 recursively performs the above steps until the end of the VLYNQ chain is reached (Steps 3–7). The enumerator 33 determines that the VLYNQ chain is ended if a discovered device has only one VLYNQ module (Step 3), or if there is no link on all VLYNQ portals of a remote device. As the enumerator is working toward reaching the end of the chain, it also creates address mappings to the VLYNQ modules that it finds along the way (Step 4). This gives the enumerator 33 the information that it needs to revisit the VLYNQ modules later in order to create mappings for the remote peripherals. Once the enumerator reaches the end of a VLYNQ chain (Step 7 and 8), it creates mappings for the peripherals on the end device (Step 9). The return total size of all remote peripheral maps is sent to be recomputed the memory maps based on return value at Step 10. At this point, the recursive algorithm returns, which effectively moves the control back to the previous VLYNQ device in the chain. It then determines if there is another local VLYNQ and if so goes onto the next VLYNQ and traverses it to the end of its chain, as before. Eventually, the program flow will return to the root device (Step 8), which means the enumerator has completed all tasks for the given branch, and returns.

The recursive nature of the algorithm allows this software to function properly on arbitrarily large VLYNQ systems. There are no limitations on the total number of VLYNQ devices or on per device VLYNQ multiplicity. However, VLYNQ hardware has some limitations such as the total amount of possible mapped space per branch (currently 64 MB), and the total amount of interrupts available per branch (32). These limitations are discussed further under Limitations and Notes.

Device Information Files

Format and Development of Device Files

This section describes the format and use of device information files. These files must contain information relating to the address map, interrupt map, and peripheral communication requirements (reverse mapping) for the device.

Below is a summary of the format used for device into files, and a simple example:

```
Device Information File Format (<device>.con)
Vlynq(id = vlynq<n>,base = <phys base addr>,
portal__size = <size>,control = <phys
register addr>,control__size = <regs size>)
<peripheral> (id = <peripheral>, base = <phys addr>,
size = <size>,[VLMapped =
<0,1>], [int__line = <a;b;c...h>, [int__type = <0,
1>;<0,1>,...<0,1>,int__pol = <0,1>;
<0,1>,...<0,1>]],[map__to = <per1;per2..per4>,
[map__to__offset = <offset1;
offset2...offset4>, map__to__size = <size1,size2...size4>]])
```

EXAMPLE

```
#VLYNQ entries
vlynq(id = vlynq0, base = 0x4000000, portal__size = 0x4000000,
control = 0x08611800, control__size = 0x100)
vlynq(id = vlynq1,base = 0x8000000,portal__size = 0x4000000,
control = 0x08611900, control__size = 0x100)
# Peripheral entries
perA(id = Peripheral A, base = 0x0b002500,size = 0x1000,
VLMapped = 1,int__line = 6;10, int__type = 1;0,int__pol = 0;1)
perB(id = Peripheral B, base = 0x0c140000,size = 0x100,
VLMapped = 1,int__line = 8, map__to = sar;sdram,
map__to__offset = 0;0x10000, map__to__size = 0x1000;0xC000)
```

Each entry in the file must contain an "id" parameter to identify the peripheral. VLYNQ entries must contain the base address and portal size, as well as the register address and size. This information can be found in the associated device specification. Peripheral entries must contain only a base address and size, but have several optional parameters.

Optional parameters are explained below:

Optional Peripheral Parameters

The VLMapped parameter is used to designate whether or not the peripheral will be included in the interrupt and memory map. If an entry of "VLMapped=0" is made in a peripheral entry, this peripheral is skipped by the enumerator. If VLMapped is set to anything else (or excluded altogether), the enumerator will attempt to map it.

The int_line (and int_type, int_pol) parameter is used to specify which interrupt lines the peripheral uses on the VLYNQ device. One may specify up to 8 interrupts per device. This is a limitation of current VLYNQ hardware, which only has 8 interrupt input lines as of the date of this specification. Multiple interrupts are supported for a single peripheral, by creating an entry with a semi-colon delimited interrupt list, as in "int_line=1;2;3;4".

The int_type and int_pol parameters may be used alongside int_line to specify the interrupt type and polarity. For int_type, a value of 0 specifies a level-sensitive interrupt, while a value of 1 is reserved for pulsed interrupts. Int_pol may be set to 0 (active high) or 1 (active low).

The map_to (and map_to_offset, map_to_size) parameter is used to map the peripheral directly to a memory region on the root device. The map_to entry should be filled in directly with a semi-colon delimited list of regions to map to (i.e. map_to =sar;sdram). The enumerator will read the root device information file looking for the sar and sdram entries, in this example. Ensure that these entries exist in the root device file. In the output file, the enumerator will replace the text "sar" and "sdram" with the mapped addresses to each of the regions.

The map_to_offset and map_to_size fields (optional) may be used to specify an offset from the base address of the root peripheral, and the size to map. If not used, the offset is assumed to be zero, and the size will be set to the entire size of the requested root memory region.

An example of the use of the map_to parameter is the VDSP device, which for some application needs to access the SAR (Segmentation and Reassembly) module on the root device.

In general, all of the information necessary to generate a device information file is available in the specification for the device. For the most efficient usage of VLYNQ resources, list all vlynq entries in the file in the order of base address, starting with 0. Do the same for all peripheral entries. All address entries in device information files should use the physical address found in the associated memory map for the device. Also, each interrupt line entry should give the number of the VLYNQ interrupt line used for that peripheral-this information should be available in the device specification.

The Output File

Output Format and File API

The following describes the output file and specifies software interface for accessing the file.

When the enumerator algorithm has completed, all of the mappings are collected and output to the output file. This file contains all of the information contained in the root file (options.conf), concatenated with any new entries that correspond to remote peripherals that have been discovered on VLYNQ devices. From the perspective of the software developer, remote peripherals can be treated in exactly the same manner as local peripherals. An example output file is given below:

Example Output File (output.con)

```
<contents of options.conf> ...
...
<concatenated output from enumerator follows>
vlynq(if = Vlinq0,locator = 1.0,regs__size=0x100,
regs__base=0xa0001180,int= 1)
vdsp(id = vdsp,locator = 1.0,base = 0xa4002000,size = 0x1000,
int = 2:3,map__to = 0xa400000, map__to__size = 0x1000)
```

In the example given above, one remote device was discovered, with one vlynq and one vdsp peripheral. The locator parameter may be ignored (it is useful to the enumerator development team as debug information in the case of failure). One will find that the base addresses given in the device information file have been altered and are now valid virtual addresses. One will also notice that the interrupt values have been remapped and may now contain a different interrupt number. Finally, for any "map_to" entries that were specified in remote device information files, the name of the root peripheral region to map_to has been replaced with a virtual address that is valid for that peripheral. In the example, assuming that the VDSP device information file contained parameter entries "map_to=sar, map_to_size=0×1000", the vdsp may now reach the SAR in the root device by accessing memory region 0×a400000-0×a401000.

```
Getting Data from the Output File
A simple API has been developed in order to
extract information from the output file.
Output File API
/*
*Returns a pointer into the file, at the "index'th" location
of "device__name" *found in the file. Use index = 1
to get a pointer to the first instance of *device__name in the
file. Pass NULL in the device__name in order to receive a
*pointer to the index'th entry of the file. The return value is
NULL if the *device__name is not found or EOF is encountered.
/*
char*get__device__info(int index, char device__name)
/*
*Pass the return value from above in the "info__ptr" parameter,
and this function returns *the string value specified by "parm". The
return value is NULL if the specified *parameter cannot be found
on the given line.
/*
char*get__device__parm(char *info__ptr, char *parm)
Example API Usage:
```

-continued

```
Int index = 1;
Char*pszString, *pszBase, *pszSize;
PszString = (char *)malloc(20);
PszBase = (char *)malloc(20);
PszSize = (char *)malloc(20);
PszString = get__device__info(index,NULL);
while (pszString!= NULL)
{
//process String information
pszBase = get__device__parm(pszString, "Base");
pszSize = get__device__parm(pszString, "Size")
...
...
//get the next line of information from the file
pszString = get__device__info(index, NULL);
index++;
}
```

Using this API, it is simple to extract any or all values from the output file. It is suggested that the software developer read all of the data in the output file into internal data structures in order to avoid accessing the file at run-time (see the above example).

Limitations and Notes

VLYNQ Address Maps

Each VLYNQ module can perform address translation for up to four mapped regions. The enumerator software maps utilizes VLYNQ map resources efficiently, sharing maps where possible. The algorithm currently uses the first map to map any VLYNQ portal registers on the remote device (if there is more than 1 VLYNQ device). If there are multiple VLYNQs on a remote device, and their base addresses are not contiguous, more that one VLYNQ map will be required. For the most efficient operation, all VLYNQ register regions should be contiguous in the memory map. If this requirement is met, a virtually unlimited number of VLYNQ modules can be supported per device.

The second VLYNQ map is typically used to allow access to remote devices that are even further "downstream". This is only necessary if the remote device has more than one VLYNQ. Since VLYNQ portals are so large (64 MB typically), it is impossible to map the entire size of a portal. Instead, assuming that VLYNQ portals have been allocated contiguously in the device memory map, one VLYNQ map is exhausted for every two VLYNQ portals. The implication of this is that VLYNQ devices may have a maximum of 7 VLYNQ modules (assuming that the device does not also have any peripherals to map).

After VLYNQ registers and portals have been mapped, any device peripherals may be mapped if any of the four maps remain, or if peripheral regions happen to be contiguous with maps that have already been configured. Again, it is important that the device designer make every effort possible to map important peripherals and registers contiguously, in order to allow the greatest possible flexibility for VLYNQ systems.

If VLYNQ map resources run out before all maps have been configured, an error message will be generated, and some peripherals will not be mapped and will not have an associated entry in the output file.

Interrupts

Each VLYNQ branch (each root VLYNQ module) may map up to 32 remote interrupts. This limitation is imposed by the 32-bit size of the Interrupt Pending/Set register in VLYNQ. A further limitation of 8 interrupts per VLYNQ device is imposed by the fact that each VLYNQ module currently supports only 8 interrupt input lines.

Each VLYNQ module in the system consumes one interrupt for any VLYNQ module interrupts that may occur. The interrupt value assigned to any VLYNQ or peripheral is written to the output file.

Interrupt Handling

Each root VLYNQ is wired to a single interrupt in the root interrupt controller. When one of the interrupts is asserted, the VLYNQ Interrupt Status/Clear register must be read to determine which interrupt(s) have occurred. The software must then compare this value to the mapped interrupt values that were read from the output file to determine the source of the interrupt. The VLYNQ Interrupt Status/Clear register may be found at the following address: (VLYNQ virtual base address=0×10). Read this memory location to determine the interrupt status. After servicing the interrupt, one should also clear the interrupt. To clear an interrupt, write a 1 to any bit in the register.

Reverse Mapping

Remote devices may require a direct mapping to a peripheral or memory region on the root device. This functionality can be used by adding the "map_to" parameter to peripherals in a device information file. Doing this consumes a single VLYNQ map in each portal VLYNQ module, and consumes one or more maps in the root VLYNQ module. One may map remote devices to a maximum of four non-contiguous address regions on the root device. If reverse maps are made to contiguous regions on the root device, the only limitation is the 64 MB portal size.

While the invention has been described and shown with reference to a preferred embodiment, it will be understood by those skilled in the art that various changes in form and detail may be made therein without departing from the spirit and scope of the invention.

The invention claimed is:

1. A communications system for enabling extension of an internal common bus architecture (CBA) segment of a first root physical semiconductor chip device to an internal CBA bus segment of at least one second external physical semiconductor chip device comprising:

said first root physical device being a communications processor having a first serial communications interface module of varying bit width in said first semiconductor chip device coupled between said internal CBA bus segment and an input and output port of said first device for serializing bus transactions from said first device to said output port of said first device and de-serializing data received at said input port to said internal CBA bus segment of said first device using chip device standard protocols;

said second external physical semiconductor chip device including a second serial communications interface module of varying bit width in said second device coupled between said internal CBA bus segment and an input and output port of said second device for serializing bus transactions from said second device to said output port of said second device and de-serializing data received at said input port to said internal CBA bus segment of said second device using said chip device standard protocols;

an external serial communications connector coupled to said input and output ports of said first and second semiconductor chip devices for transferring the serialized transactions between said first and second devices using said chip device standard protocols, and an enumerator in said first root semiconductor chip device for automatically configuring for said at least one second serial communications interface module added to the system wherein said enumerator reads a remote device identification register for said at least one second serial communications interface module and locates associated device configuration file and abstracts knowledge of the hardware of said second external device and accompanying register set and creates address and interrupt map between said second interface module and said root semiconductor chip device using said chip device standard protocols.

2. The system of claim 1 wherein said enumerator includes means for inputting properly formatted device configuration files for each said second device attached in the system and provides an output file that contains address maps and interrupts information for each device and modules discovered in the system.

3. The system of claim 1 wherein said enumerator has a recursive discovery and configuration algorithm that discovers all remote devices and creates address and interrupt maps between said remote devices and the root device.

4. A communication system for enabling extension of an internal common bus architecture (CBA) bus segment of a first root semiconductor chip device to an internal CBA bus segment of at least one remote semiconductor chip device comprising:

a first interface communications module of varying bit width and using chip device standard protocols in said first root semiconductor chip device and a second interface module of varying bit width and using said chip device standard protocols in said at least one remote semiconductor chip device and an external communications connector between these modules using said chip device standard protocols; and said first root semiconductor chip device includes an enumerator for automatically configuring for said remote device to be added to the system using said chip device standard protocols by a recursive discovery and configuration algorithm wherein said enumerator reads a remote device identification register for said at least one second serial communications interface module and locates associated device configuration file and abstracts knowledge of the hardware of said second external device and accompanying register set and creates address and interrupt map between said second interface module and said root semiconductor chip device.

5. The system of claim 4 wherein said remote device is daisy chained to a further remote semiconductor chip device of varying width by a third interface module using said chip device standard protocols and wherein said enumerator automatically configures for said further remote semiconductor chip device to be added to the system by said recursive discovery and configuration algorithm.

6. The system of claim 5 wherein said enumerator reads said remote semiconductor chip device identification register and locates associated device configuration file and then determines if the remote has more than one interface module and if there is more than one interface module, the enumerator recursively performs the above steps until the end of the interface chain is reached.

7. The system of claim 6 wherein as the enumerator is working toward reaching the end of the chain, it also creates address mappings to the interface modules that it finds along the way to give the enumerator the information that it needs to revisit the interface modules later in order to create mappings for the remote peripherals.

8. The system of claim 7 wherein once the enumerator reaches the end of an interface module chain, it creates mappings for the peripherals on the end device and the return total size of all remote peripheral maps is used to compute the memory maps based on return value and the recursive algorithm returns, which effectively moves the control back to the previous interface module device in the chain and then determines if there is another local interface module and if so goes onto the next interface module and traverses it to the end of its chain.

* * * * *